Mar. 6, 1923.
A. R. TITUS.
EGG TRAY.
FILED MAY 31, 1922.
1,447,826.
2 SHEETS—SHEET 1.
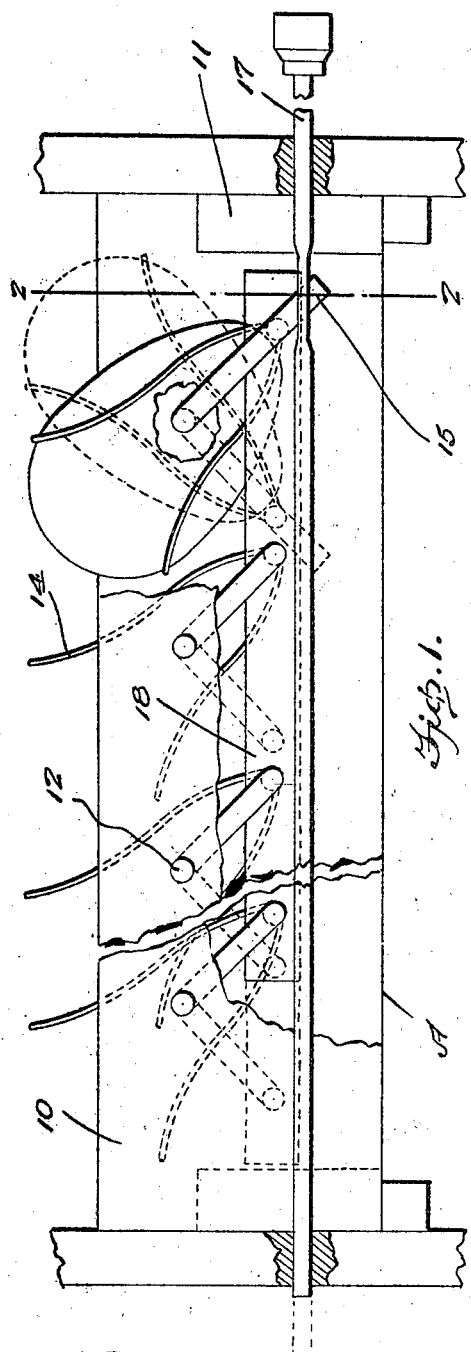
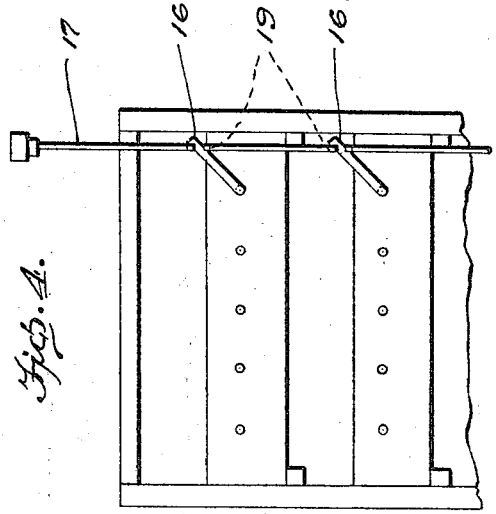
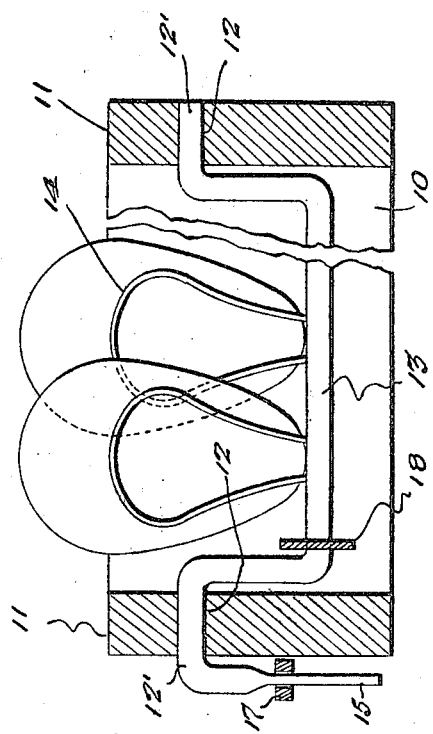
A. R. Titus INVENTOR
BY Victor J. Evans
ATTORNEY
WITNESS:

Mar. 6, 1923.
A. R. TITUS.
EGG TRAY.
FILED MAY 31, 1922.
1,447,826.
2 SHEETS—SHEET 2.
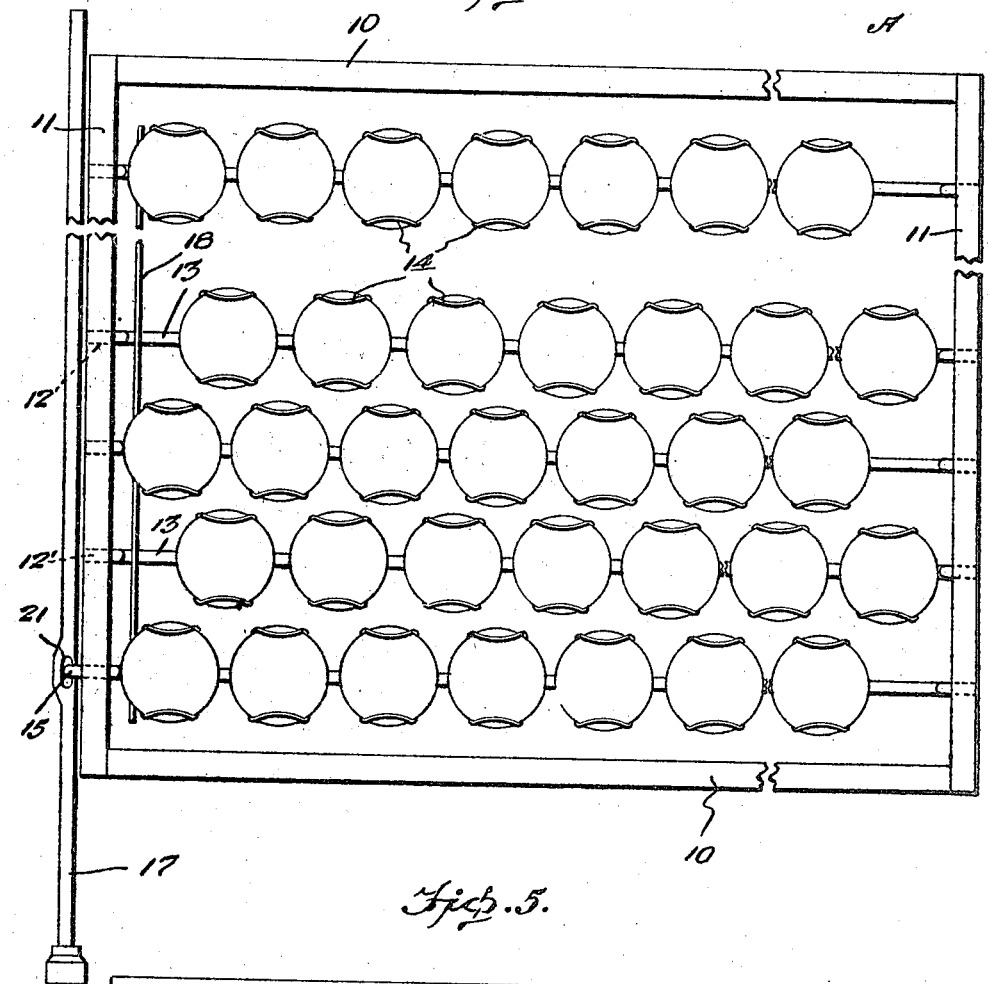
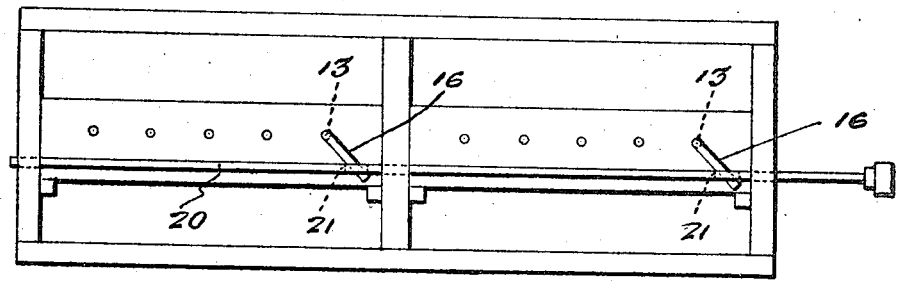
A. R. Titus
INVENTOR
BY Victor J. Evans
ATTORNEY Patented Mar. 6, 1923.

1,447,826

UNITED STATES PATENT OFFICE.

ARTHUR R. TITUS, OF GAMBIER, OHIO.

EGG TRAY.

Application filed May 31, 1922. Serial No. 564,755.

*To all whom it may concern:*

Be it known that I, ARTHUR R. TITUS, a citizen of the United States, residing at Gambier, in the county of Knox and State of Ohio, have invented new and useful Improvements in Egg Trays, of which the following is a specification.

This invention relates to an egg turning device for use in conjunction with incubators, and includes a plurality of trays each of which supports a large number of eggs, and means for turning all of the eggs simultaneously through an arc of a circle, by means of a single operating element, irrespective of whether the trays are arranged side by side or in superimposed relation.

The nature and advantages of the invention will be better understood when the following detailed description is read in connection with the accompanying drawings, the invention residing in the construction, combination, and arrangement of parts as claimed.

In the drawings forming part of this aplication, like numerals of reference indicate similar parts in the several views, and wherein:—

Figure 1 is a side elevation of one of the trays showing by dotted lines, the different positions in which the eggs may be arranged.

Figure 2 is a sectional view taken on line 2—2 of Figure 1.

Figure 3 is a plan view of one of the trays.

Figure 4 is a fragmentary sectional view, showing the arrangement of parts when the trays are positioned one above the other.

Figure 5 is a similar view, showing the construction and arrangement of parts when the trays are arranged side by side.

Referring to the drawings in detail, A indicates generally one of the trays which supports the eggs, and this tray includes a frame-like supporting structure made up of spaced parallel sides and ends 10 and 11 respectively. The ends 11 are provided with openings 12 in which the adjacent crank terminals 12 of the shafts 13 are journaled. These shafts are arranged in spaced parallel relation and each supports a plurality of egg holders 14 which may be of any suitable configuration, and also constructed from any suitable material. One of the shafts 13 has one end extended as at 15 for association with an operating rod 17, whereby this shaft can be partly rotated in either direction, with a view of turning the eggs through an arc of a circle.

Arranged within the confines of the tray or frame A, and connecting all of the shafts 13 is a rod 18, so that all of the shafts 13 are simultaneously rotated in a manner and for the purpose just stated, incident to the operation of the rod 17. When the trays are arranged in superimposed relation, the rod 17 is provided with a plurality of closely associated slots 19 which receives the extensions 16 of the corresponding shafts of the respective trays, and it is obvious that by elevating or lowering this rod 17, the shafts of the series of trays are all simultaneously rotated. As illustrated in Figure 5, when the trays are arranged side by side, in contradistinction to their superimposed relation illustrated in Figure 4, a rod 20 is used and which rod is provided with openings 21 which are arranged a greater distance apart than the slots 18 of the rod 17. Each one of these openings 21 receive the extension 16 of the shaft 13 of each tray, and when this rod is reciprocated, the shafts of the series of trays are rotated for the purpose specified.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. An egg turning device comprising a tray including spaced parallel side and end members, shafts arranged within the tray and having crank-like terminals journaled in openings in the end members thereof, a plurality of egg holders supported by each shaft, the crank portion of one shaft being extended to provide an extension arranged in parallel relation with the adjacent member, an operating rod associated with said extension to partially turn said shaft in either direction, and a rod arranged within the tray and connecting all of said shafts, whereby the latter are rotated in unison.

2. In combination, a series of trays arranged in juxtaposition, each tray including a frame-like member made up of spaced parallel sides and ends, a plurality of shafts arranged within each tray and having crank-like terminals journaled in the ends thereof, a rod connecting all of the shafts of each tray, whereby said shaft are simultaneously rotated, a plurality of egg holders supported by each shaft, the crank portion of one shaft of each tray being extended to provide an extension arranged in parallelism with the adjacent end of the tray, and an operating rod connected with all of the extensions of the corresponding shafts of the series of trays for rotating the shafts as and for the purpose specified.

In testimony whereof I affix my signature.

ARTHUR R. TITUS.